(12) United States Patent
Li

(10) Patent No.: US 10,333,401 B2
(45) Date of Patent: *Jun. 25, 2019

(54) CIRCUITS AND DEVICES RELATED TO VOLTAGE CONVERSION

(71) Applicant: SKYWORKS SOLUTIONS, INC., Woburn, MA (US)

(72) Inventor: Hai-Bo Li, Wuxi (CN)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,647

(22) Filed: Jun. 19, 2018

(65) Prior Publication Data
US 2018/0367035 A1 Dec. 20, 2018

Related U.S. Application Data

(63) Continuation of application No. 15/095,020, filed on Apr. 9, 2016, now Pat. No. 10,003,259.

(51) Int. Cl.
H02M 3/156 (2006.01)
H02M 1/00 (2006.01)

(52) U.S. Cl.
CPC .... H02M 3/156 (2013.01); H02M 2001/0009 (2013.01); H02M 2001/0022 (2013.01)

(58) Field of Classification Search
CPC . G05F 1/462; G05F 1/56; G05F 1/562; G05F 1/575; G05F 1/565; H02M 3/10; H02M 3/135; H02M 3/145; H02M 3/155; H02M 3/158; H02M 3/156; H02M 3/157
See application file for complete search history.

(56) References Cited

U.S. PATENT DOCUMENTS

| 5,481,178 | A | 1/1996 | Wilcox et al. | |
| 6,049,473 | A | 4/2000 | Jang et al. | |
| 8,138,739 | B1 | 3/2012 | Eirea et al. | |
| 9,158,314 | B2 | 10/2015 | Kung et al. | |
| 10,003,259 | B2 * | 6/2018 | Li | H02M 3/156 |
| 10,063,143 | B1 * | 8/2018 | Fan | H02M 3/156 |
| 2005/0017703 | A1 | 1/2005 | Walters et al. | |
| 2008/0084198 | A1 | 4/2008 | Baurle et al. | |
| 2008/0315852 | A1 | 12/2008 | Jayaraman et al. | |
| 2008/0316779 | A1 | 12/2008 | Jayaraman et al. | |
| 2011/0101937 | A1 | 5/2011 | Dobkin et al. | |
| 2012/0249093 | A1 | 10/2012 | Grbo et al. | |
| 2012/0293145 | A1 | 11/2012 | De Cremoux et al. | |
| 2014/0292293 | A1 | 10/2014 | Feckl et al. | |
| 2015/0381037 | A1 | 12/2015 | Romeo | |

* cited by examiner

Primary Examiner — Adolf D Berhane
(74) Attorney, Agent, or Firm — Chang & Hale LLP

(57) ABSTRACT

Circuits and devices related to voltage conversion. In some embodiments, a voltage converter can include a voltage conversion circuit configured to convert an input voltage to an output voltage based on a drive signal, and a feedback circuit configured to generate an error signal based on the output voltage and a reference voltage. The voltage converter can further include a feedforward circuit configured to generate a feedforward signal indicative of a change opposite to that of a change in the input voltage. The voltage converter can further include a drive control circuit configured to generate the drive signal based on the feedforward signal and the error signal.

20 Claims, 11 Drawing Sheets

CIRCUITS AND DEVICES RELATED TO VOLTAGE CONVERSION

CROSS-REFERENCE TO RELATED APPLICATION(S)

This application is a continuation of U.S. application Ser. No. 15/095,020 filed Apr. 9, 2016, entitled VOLTAGE CONVERTER AND CONTROL METHOD THEREOF, the benefit of the filing date of which is hereby claimed and the disclosure of which is hereby expressly incorporated by reference herein in its entirety.

TECHNICAL FIELD

The present application relates to a field of electronic technique, more particularly, to a voltage converter and control method thereof.

BACKGROUND

Electronic apparatus typically include therein electronic modules such as different subsystems, circuits, and so on. These electronic modules usually require different supply voltages (e.g., 1.8 volts, 2.5 volts etc.) for achieving normal operations. To ensure normal operations of every electronic module in electronic apparatus, a voltage converter is typically utilized to convert a DC voltage (e.g., a voltage from a battery) to another different DC voltage as required by every electronic module, that is, a specific input voltage Vin is converted into a different output voltage Vout.

In existing voltage converters, for example, electric energy at an input is stored transitorily in an inductor and/or a capacitor (e.g., a charging process is performed), and thereafter the electric energy is released at a different voltage at an output (e.g., a discharging process is performed), so that the input voltage Vin is converted into the desired output voltage Vout. Accordingly, a drive signal is employed to drive a control device (e.g., a switch) in the voltage converter, by which the charging process and the discharging process are controlled so as to obtain the desired output voltage Vout. That is, a turn-on time Ton during which the switch is ON to charge and a turn-off time Toff during which the switch is OFF to discharge are controlled. The turn-on time Ton corresponds to the pulse width of the drive signal.

In the operation process of the voltage converter, the input voltage Vin usually is not fixed, and may generate jumping change. For example, in electronic apparatus such as a mobile phone, a tablet computer, a digital camera etc., a battery therein has relatively large parasitic resistance. When a module (e.g., a flash drive, a RF module) in the electronic apparatus, which requires very large current, is triggered, it may lead to an instant and significant drop for the output voltage of the battery. Therefore, it's desired that the voltage converter has very good transient response characteristic, so that even if there is an instant drop in the output voltage of the battery (corresponding to the input voltage Vin of the voltage converter), the voltage converter can also provide stable output voltage, allowing the electronic modules driven by the voltage converter to operate normally. The transient response characteristic of the voltage converter is closely related to its bandwidth. The larger the bandwidth is, the better the transient response characteristic is; the smaller the bandwidth is, the worse the transient response characteristic is. Therefore, in order to enhance the transient response characteristic of the voltage converter, it is desirable to increase its bandwidth as much as possible. However, when the bandwidth has been increased to a certain extent, the parasitic zero pole at high frequency may be included within the bandwidth, which may make a design of the frequency compensation become very complex and difficult. In addition, as for a boost converter, there is a right-half-plane zero point at low frequency (about several hundred kHz), whose bandwidth has to be set within the right-half-plane zero point to meet the stability requirement, so it is hard to improve the transient response of the boost converter. Hence, the application provides an input voltage feedforward device, which may notably enhance the transient response characteristic of the voltage converter as for a certain bandwidth.

SUMMARY

Aspects of the present disclosure may relate to a control device and a control method for a voltage converter, and the voltage converter, which can improve the transient response characteristic of the voltage converter. Accordingly, it allows the output voltage to maintain favorable linear state even if an input voltage changes.

A voltage converter according to an embodiment of the present disclosure may comprise a voltage conversion circuit, a feedback circuit, a drive control circuit and a feedforward circuit. The voltage conversion circuit receives a drive signal from the drive control circuit, and converts an input voltage to a desired output voltage based on the drive signal. The feedback circuit compares the output voltage with a reference voltage, and outputs an error signal. The error signal is used for indicating a difference between the output voltage and a target voltage to be output by the voltage converter. The feedforward circuit receives the input voltage, and generates a feedforward signal for the input voltage. The feedforward signal has a change opposite to that of the input voltage. The drive control generates the drive signal for driving the voltage conversion circuit based on the feedforward signal and the error signal. The drive signal is provided to a control device in the voltage conversion circuit for controlling charging and discharging operations thereof.

A voltage conversion method according to an embodiment of the present disclosure may comprise: converting an input voltage to a desired output voltage by using a voltage conversion circuit; comparing the output voltage with a reference voltage, corresponding to a target voltage to be output by the voltage converter, by using a feedback circuit, and outputting an error signal; generating a feedforward signal for the input voltage based on the input voltage by using a feedforward circuit, where the feedforward signal is a pulse signal having a changing tendency opposite to that of the input voltage; and generating a drive signal for driving the voltage conversion circuit based on the feedforward signal and error signal by using a drive control circuit.

In technical solutions of a control device and a control method for a voltage converter, and a voltage converter according to the embodiments of the present disclosure, the transient response characteristic of the voltage converter can be improved by setting an input voltage feedforward circuit, by which a jumping change of an input voltage is quickly converted into a feedforward signal to control the operation of the voltage converter. Accordingly, it allows the output voltage to maintain favorable linear state even if the input voltage changes.

BRIEF DESCRIPTION OF THE DRAWINGS

In order to more clearly explain the technical solutions, drawings referenced in the description of embodiments or conventional technologies are briefly introduced below. The drawings described below are merely some embodiments of the present disclosure, from which a person of ordinary skill in the art can also obtain other drawings according to these drawings. Identical reference numerals typically indicate identical components throughout these drawings.

DETAILED DESCRIPTION

Figure 1:
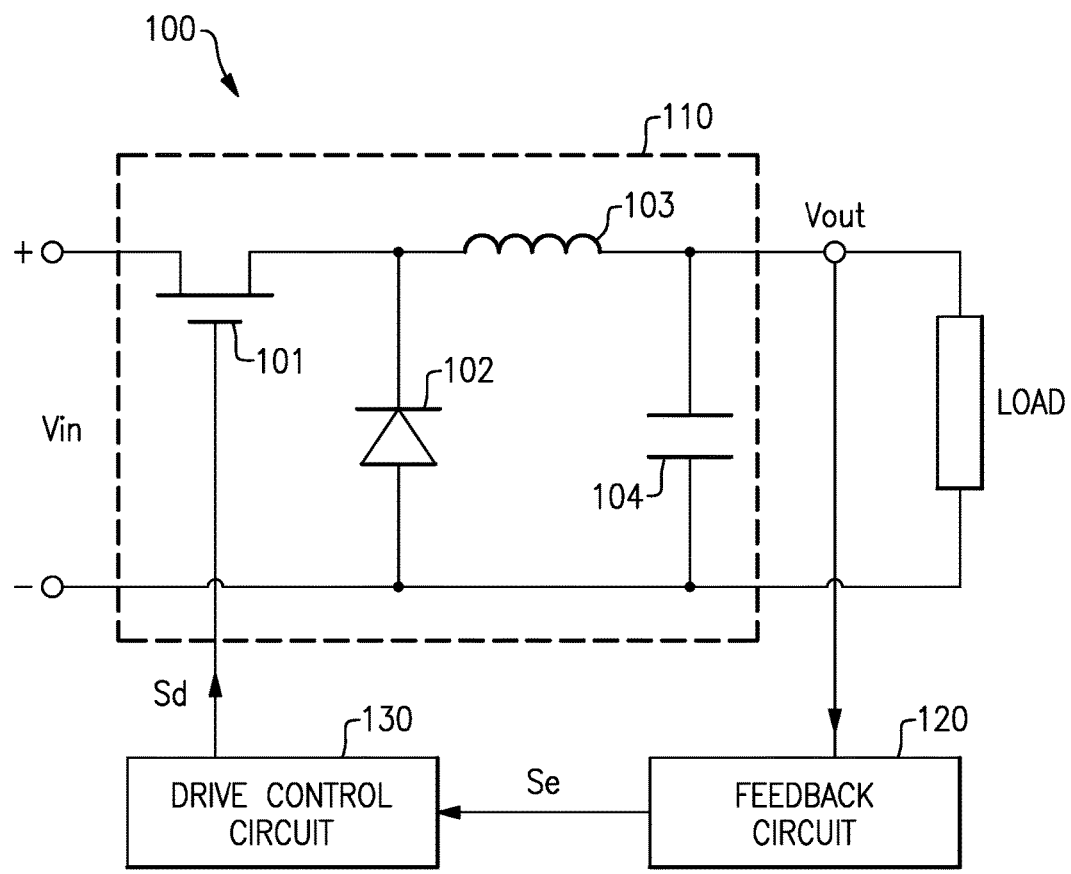
FIG. 1 is a block diagram schematically illustrating a conventional voltage converter.

A voltage converter to which the present disclosure relates may be a boost converter, a buck converter, or a boost-buck converter etc. The voltage converter can be used to convert a supply voltage to one or more voltages required by respective electronic module(s) in electronic apparatus. The electronic modules for example can be an RF amplifier, a display device, and so on. The electronic apparatus including electronic modules for example can be a mobile phone, a tablet computer, a monitor, an e-book reader, a portable digital media player, and so on. Types of the voltage converter, electronics modules to which the power is supplied, and electronic apparatus to which it is applied do not constitute limitations to the present disclosure.

A source and a drain of a transistor in the present disclosure can be symmetrical. Accordingly, the source and the drain of a transistor can be interchangeable. In an embodiment of the present disclosure, in order to distinguish two electrodes of a transistor except a gate, one is called a source and the other is called a drain. In the drawings, as for a P-type transistor, a signal input terminal is taken as a source and a signal output terminal is taken as a drain; as for an N-type transistor, a signal input terminal is taken as a drain and a signal output terminal is taken as a source. A P-type transistor is turned on upon a low level at the gate and is turned off upon a high level at the gate. An N-type transistor is turned on upon a high level at the gate and is turned off upon a low level at the gate. Unless explicitly noted, the transistors in embodiments of the present disclosure may be implemented by any type of transistors, including but not limited to thin film transistors.

FIG. 1 is a block diagram schematically illustrating a conventional voltage converter 100. The voltage converter 100 shown in FIG. 1 converts an input voltage Vin to an output voltage Vout, which may be used for powering a load. As shown in FIG. 1, the voltage converter 100 may comprise a voltage conversion circuit 110, a feedback circuit 120 and a drive control circuit 130.

The voltage converter 100 in FIG. 1 is a buck conversion circuit. In the case of a boost converter, the voltage conversion circuit 110 is a boost conversion circuit; in the case of a boost-buck converter, the voltage conversion circuit 110 is a boost-buck conversion circuit. The voltage conversion circuit 110 is used for converting an input voltage Vin into a desired output voltage Vout.

The buck conversion circuit 110 in FIG. 1 comprises a transistor 101, a diode 102, an inductor 103 and a capacitor 104. The transistor 101 operates under driving of the drive signal Sd to control charging and discharging operations of the inductor 103. The inductor 103 is located between an output terminal of the transistor 101 and a port of the output voltage Vout, for performing charging and discharging operations. The diode 102 has a cathode connected to the input voltage Vin via the transistor 101. And the diode 102 has an anode being grounded. The capacitor 104 is connected between the port of the output voltage Vout and the ground, for ensuring stable output of the output voltage Vout.

During the charging process, the transistor 101 is turned on, the diode 102 is open, the inductor 103 is charged and the inductance current is generated; since the input voltage Vin is direct current (DC), an inductance current on the inductor 103 increases linearly in a certain rate, correspondingly, the current passes through two terminals of the load, so as to have the output voltage. During the discharging process, the transistor 101 is tuned off, the diode 102 is a short circuit, and because of a holding characteristic of the inductance current, the current that passes through the inductor 103 will slowly decrease from a value when the charging is completed, until a next charging process starts or the current value drops to zero; correspondingly, the inductor L (103) starts to charge the capacitor C (104), thereby the output voltage Vout is maintained. In the voltage conversion circuit 110 in FIG. 1, the diode 102 may also be replaced with a transistor. The alternative transistor is turned off during the charging process, and turned on during the discharging process. Correspondingly, the drive control circuit 130 may generate a drive signal for the alternative transistor. In this case, the control device includes both the transistor 101 and the alternative transistor.

The feedback circuit 120 receives the output feedback (e.g., the output voltage Vout) of the voltage converter 100, compares it with a reference voltage Vref that corresponds to a target voltage to be output, and outputs an error signal Se. The feedback circuit 120 for example may include a sampling circuit and an operation amplifier. The sampling circuit is used to sample the output voltage Vout, and provide the sampled output voltage Vout to an input terminal of the operation amplifier. The operation amplifier includes two input terminals and one output terminal. One input terminal receives the output from the sampling circuit, the other input terminal receives the reference voltage Vref, and outputs the error signal Se that represents a difference between the real output voltage of the voltage converter 100 and its target output voltage.

The drive control circuit 130 generates a drive signal Sd for driving the transistor 101 according to an error signal Se output by the feedback circuit 120, to obtain a desired output voltage Vout. The drive control circuit 130 may for example include a frequency compensation circuit and a pulse width modulation (PWM) circuit. The frequency compensation circuit implements frequency compensation for the error signal Se to make it not vibrate, thereby ensuring a stable output. The PWM circuit implements pulse width modulation to the output of the frequency compensation circuit, so as to output a PWM pulse as a drive signal Sd. The drive signal Sd is used for driving operations of the transistor 101.

The feedback circuit 120 and the drive control circuit 130 form a negative feedback loop, which allows the output voltage Vout of the voltage converter 100 to stably correspond to the target output voltage.

In the voltage converter 100 shown in FIG. 1, a PWM pulse is used for controlling operations of the voltage conversion circuit 110. When the input voltage Vin changes in a jumping manner, the PWM pulse may not be immediately adjusted with the change of the input voltage Vin, so as to quickly adjust the operation status of the voltage converter 100. When the input voltage Vin changes in a jumping manner, a certain range of fluctuation occurs in the output voltage Vout. Only if the fluctuating output of the output voltage Vout has passed through the feedback loop and been sampled and adjusted, the output voltage Vout of the voltage converter 100 may restore to the voltage before the fluctuation. Therefore, when the input voltage Vin changes in a jumping manner, fluctuation is generated in the output voltage Vout, and the output voltage Vout may make response to the input voltage Vin only if it has been adjusted by the feedback loop, and such process shows hysteresis.

As to the voltage converter in a current mode, when the input voltage Vin changes, the sampling current of the output current may form a current loop, and immediately change so as to adjust a duty cycle of the voltage conversion circuit 110, so as to adjust the output voltage. The current loop can reduce the hysteresis to a certain extent, but the current loop needs to implement slope compensation to prevent the voltage converter from generating secondary slope oscillation. Moreover, when the input voltage Vin changes greatly, it is typically necessary to increase the compensation value of the slope compensation. Accordingly, when a sawtooth waveform signal is obtained by adding the sampling current and the slope compensation signal, the sawtooth waveform signal determines a duty cycle of the voltage conversion circuit 110. It may greatly weaken adjustment function of the current loop such that the sampling current signal takes up a rather small portion in the sawtooth waveform signal.

In an embodiment of the present disclosure, a feedback circuit for the input voltage Vin is set, by which the jumping change of the input voltage Vin is quickly converted into a feedforward signal to control the operation of the voltage converter, and the transient response characteristic of the voltage converter can be improved. Accordingly, it allows the output voltage to maintain favorable linear state even if the input voltage changes.

Figure 2:
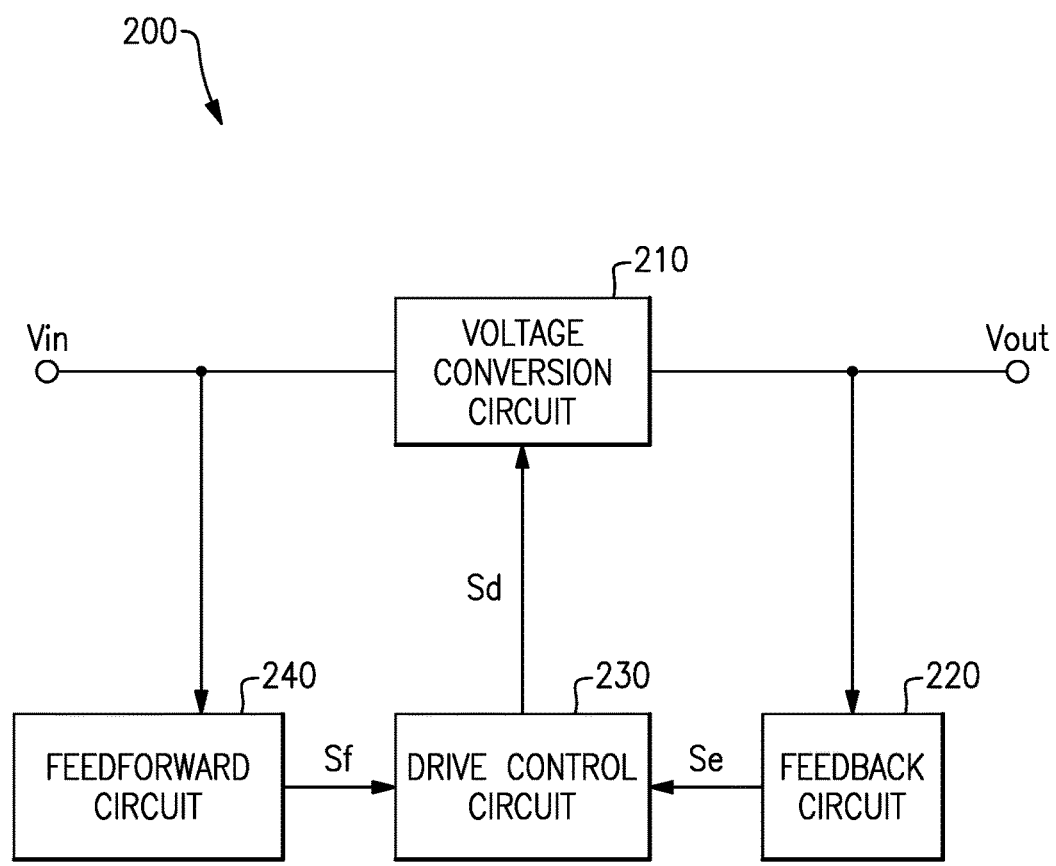
FIG. 2 is a block diagram schematically illustrating a first voltage converter according to an embodiment of the present disclosure.

FIG. 2 is a block diagram schematically illustrating a first example of a voltage converter 200 according to an embodiment of the present disclosure. As shown in FIG. 2, the voltage converter 200 may include a voltage conversion circuit 210, a feedback circuit 220, a drive control circuit 230 and a feedforward circuit 240.

The voltage conversion circuit 210 can be configured to receive a drive signal Sd from the drive control circuit 230, and converts an input voltage Vin into a desired output voltage Vout based on the drive signal Sd. The voltage conversion circuit 210 may be anyone of a buck conversion circuit, a boost conversion circuit or a boost-buck conversion circuit. In the case of a buck conversion circuit, the voltage conversion circuit 210 may have a structure similar to that of the voltage conversion circuit 110 described herein in reference to FIG. 1.

In the case where the voltage conversion circuit 210 is a boost conversion circuit, the output voltage Vout is higher than the input voltage Vin; in the case that the voltage conversion circuit 210 is a buck conversion circuit, the output voltage Vout is lower than the input voltage Vin; in the case that the voltage conversion circuit 210 is a boost-buck conversion circuit, the output voltage Vout may be higher or lower than the input voltage Vin.

The feedback circuit 220 can be configured to compare the output voltage Vout with a reference Vref, and output an error signal Se. The reference voltage Vref corresponds to a target voltage to be output by the voltage converter 200. The feedback circuit 220 can correspond to the feedback circuit 120 in FIG. 1, and may for example include a sampling circuit and an operation amplifier. Furthermore, the feedback circuit 220 may also be implemented by a voltage divider and an operation amplifier. The voltage divider is used for taking a portion of the output voltage Vout, for example taking 1/10 of the output voltage Vout, and the taken output voltage can be compared with a reference voltage Vref to output an error signal Se. The error signal Se is used for indicating the difference between the output voltage Vout and a target voltage to be output by the voltage converter 200.

The feedforward circuit 240 can be configured to receive the input voltage Vin, and generate a feedforward signal Sf for the input voltage Vin. When the input voltage Vin changes, the feedforward signal Sf can have a change opposite to that of the input voltage Vin. For example, when the input voltage increases from a first voltage to a second voltage, the feedforward signal Sf may change from high to low; when the input voltage decreases from a second voltage to a first voltage, the feedforward signal Sf may change from low to high. When the input voltage Vin stays stable, the feedforward circuit 240 outputs a stable feedforward signal Sf.

The drive control circuit 230 is in communication with the feedforward circuit 240 and the feedback circuit 220. The drive control circuit 230 can be configured to receive a feedforward signal Sf from the feedforward circuit 240, and receive an error signal Se from the feedback circuit 220. The drive control circuit 230 can be configured to generate a drive signal Sd for driving the voltage conversion circuit 210 based on the feedforward signal Sf and the error signal Se. The drive signal Sd is provided to a control device for controlling the charging and discharging operation in the voltage conversion circuit 210. The control device can be different with different voltage conversion circuit 210. For example, in the voltage conversion circuit 110 shown in FIG. 1, the control device is a transistor 101, to which the drive signal Sd is provided.

In the case where the first voltage converter 220 operates in a voltage mode, the drive control circuit 230 may for example include a frequency compensation circuit and a pulse width modulation PWM circuit. The frequency compensation circuit implements frequency compensation for the error signal Se and the feedforward signal Sf to make them not vibrate, thereby ensuring a stable output. The PWM circuit implements pulse width modulation to the output of the frequency compensation circuit so as to output a PWM pulse as a drive signal Sd. For examples, the drive signal Sd is used for driving operations of the transistor 101 in FIG. 1. In the case where the first voltage converter 220 operates in a current mode, the drive control circuit 230 can further include a slope compensation circuit. The slope compensation circuit is used for sensing the output current in the voltage conversion circuit 210, implements slope compensation to the sensed current, and provides the slope-compensated current to the PWM circuit for pulse width modulation, so as to output a drive signal Sd.

The feedback circuit 220 and the drive control circuit 230 form a negative feedback loop, which makes the output voltage Vout of the voltage converter 200 to stably correspond to a target output voltage. In the example of FIG. 2, the feedback circuit 220 and the feedforward circuit 240 can form a feedforward loop, which makes the voltage converter 200 to output a stable output voltage Vout even if the input voltage Vin of the voltage converter 200 changes.

The structure of the voltage converter 200 in FIG. 2 is merely an example. In some embodiments, the voltage converter 200 may further include other circuits, such as a mode control circuit, an oscillator, and so on. The mode control circuit for example can control the operation of the voltage conversion circuit 210 in different modes. The operation mode may for example include a continuous control mode, a discontinuous control mode etc.

In the voltage converter 200 according to an embodiment of the present disclosure shown in FIG. 2, a feedforward circuit 240 for the input voltage Vin is set, by which the jumping change of the input voltage Vin is quickly converted into a feedforward signal for controlling the operation of the voltage converter 200. The transient response characteristic of the voltage converter is improved. Accordingly, it allows the output voltage to maintain favorable linear state even if the input voltage changes.

Figure 3:
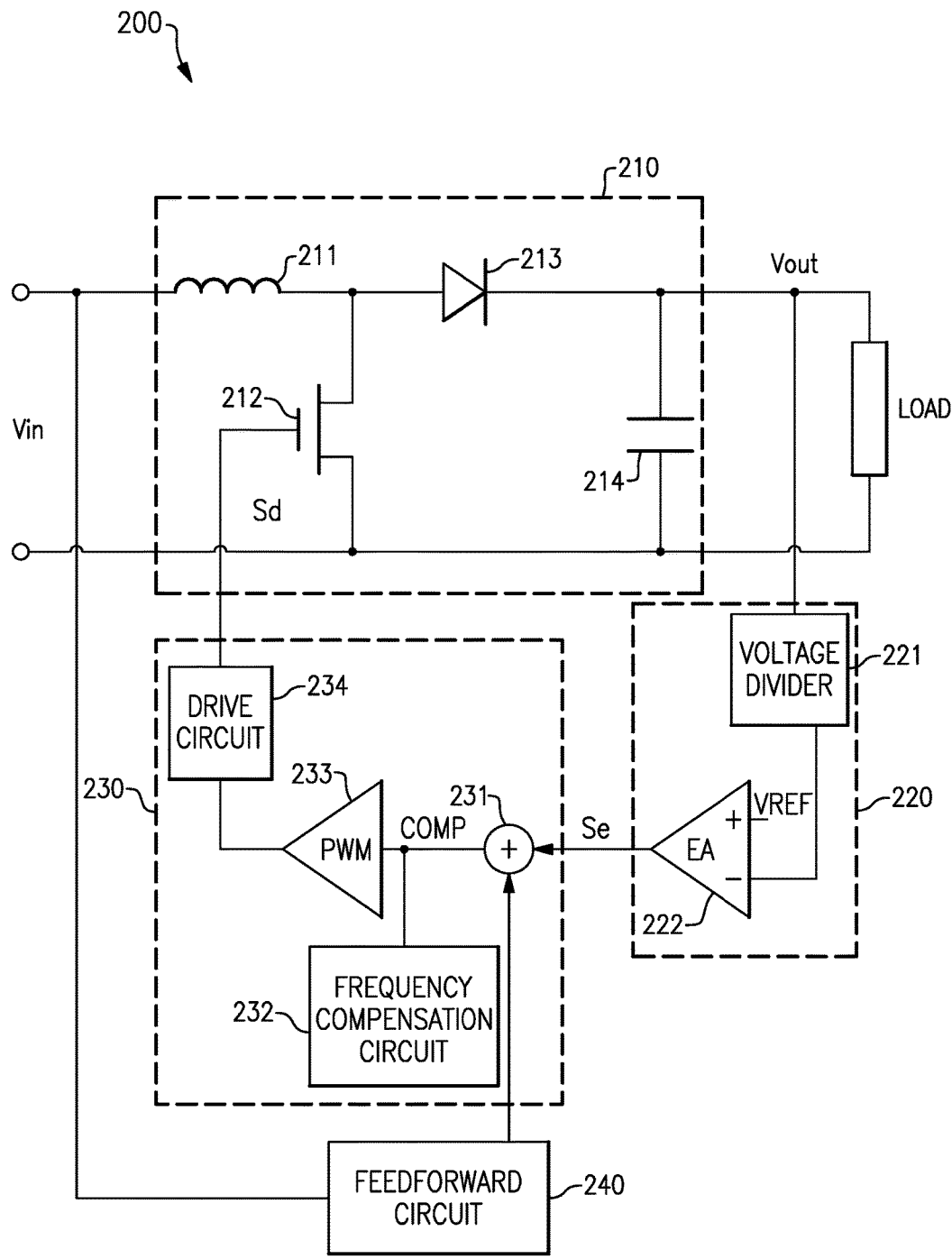
FIG. 3 schematically illustrates an example implementation of the voltage converter in FIG. 2.

FIG. 3 schematically illustrates a first example of the voltage converter 200 in FIG. 2. The voltage converter in FIG. 3 is a boost converter. The boost converter may include a voltage conversion circuit 210, a feedback circuit 220, a drive control circuit 230 and a feedforward circuit 240.

As shown in FIG. 3, the voltage conversion circuit 210 may include an inductor 211, a transistor 212, a diode 213 and a capacitor 214. The inductor 211 receives the input voltage Vin, and is connected to the ground via the transistor 212. The inductor 211 is charged during a turn-on time Ton and discharged during a turn-off time Toff. The capacitor 214 has one terminal connected to a connection point of the inductor 211 and the transistor 212 via the diode 213, and the other terminal of the capacitor 214 is grounded. The capacitor 214 is used for ensuring stable output of the output voltage Vout. The transistor 212 controls the conversion operation of the voltage conversion circuit 210 by being driven by the drive signal Sd output from the drive control circuit 230. During the charging process, the transistor 212 is turned on, and the diode 213 is off. During the discharging process, the transistor 212 is turned off, and the diode 213 is on. The transistor 212 is a control device of the boost converter. The voltage conversion circuit 210 shown in FIG. 3 is an example, which may further have other structure. For example, the diode 213 may be replaced with a transistor, which is controlled to be turned on and turned off by a drive signal Sd.

The voltage conversion circuit 210 in FIG. 3 receives the drive signal Sd from the drive control circuit 230, and converts the input voltage Vin into the desired output voltage Vout based on the drive signal Sd.

The feedback circuit 220 in FIG. 3 compares the output voltage Vout with a reference voltage Vref, and outputs an error signal Se. As shown in FIG. 3, the feedback circuit 220 includes a voltage divider 221 and an operation amplifier (EA) 222. The voltage divider 221 is used for taking a portion of the output voltage Vout, and provides the taken output voltage to the operation amplifier 222. The operation amplifier 222 also receives a reference voltage Vref along with the output from the voltage divider 221. The operation amplifier 222 compares the output from the voltage divider 221 with the reference voltage Vref to output the error signal Se. The error signal Se is used to indicate the difference between the output voltage Vout and a target voltage to be output by the voltage converter 200.

The drive control circuit 230 in FIG. 3 receives a feedforward signal Sf from the feedforward circuit 240, receives an error signal Se from the feedback signal circuit 220, and then generates the drive signal Sd for driving the voltage conversion circuit 210 based on the feedforward signal Sf and the error signal Se. The drive signal Sd is provided to a control device for controlling the charging and discharging process in the voltage conversion circuit 210. As shown in FIG. 3, the drive control circuit 230 includes an adder 231, a frequency compensation circuit 232, a PWM circuit 233 and a drive circuit 234.

The adder 231 adds the feedforward signal Sf from the feedforward circuit 240 and the error signal Se from the feedback circuit 220. The frequency compensation circuit 232 implements frequency compensation for the output (e.g., the sum of the error signal Se and the feedforward signal Sf) of the adder 231 and obtains a compensation signal COMP, to make it not vibrate, and thus a stable output is ensured. The PWM circuit 230 implements pulse width modulation to the output from the frequency compensation circuit 232, and obtains a PWM signal. The drive circuit 234 generates a drive signal for driving the control device in the voltage conversion circuit 210 based on the PWM signal. For example, in the structure of the voltage conversion circuit shown in FIG. 3, the drive circuit 234 generates a drive signal for driving the transistor 212 based on the PWM signal. In the case where the diode 213 in FIG. 3 is replaced with a transistor, the drive circuit 234 generates a drive signal for driving the transistor 212 and the transistor (for replacing the diode 213) based on the PWM signal.

The structure of the drive control circuit 230 shown in FIG. 3 is an example, and may add other devices or omit devices therein as necessary. For example, in the case where the feedforward signal Sf and the error signal Se have stable phases, the drive control circuit 230 may not include the frequency compensation circuit 232. In another example, in the case where the control device in the voltage conversion circuit 210 is one transistor, it is also possible to drive the control device directly by using the PWM circuit 233, thereby omitting the drive circuit 234.

The feedforward circuit 240 receives the input voltage Vin and generates a feedforward signal Sf for the input voltage Vin. As described above, when the input voltage Vin changes, the feedforward signal Sf has an change opposite to that of the input voltage Vin; when the input voltage Vin stays stable, the feedforward circuit 240 outputs a stable feedforward signal Sf.

Figure 4:
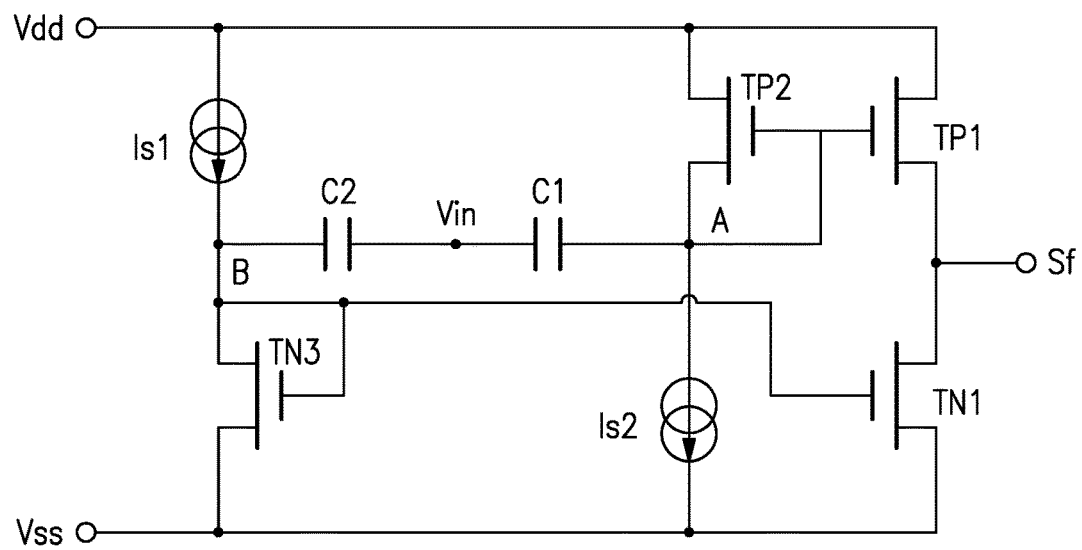
FIG. 4 is a circuit diagram schematically illustrating an example structure of a feedforward circuit.

FIG. 4 is a circuit diagram schematically illustrating an example structure of the feedforward circuit 240 in FIG. 3.

As shown in FIG. 4, the feedforward circuit 240 may include P-type transistors TP1 and TP2, N-type transistors TN1 and TN3, capacitors C1 and C2, and current sources Is1 and Is2. P-type transistors TP1 and TP2 form a current mirror. N-type transistors TN1 and TN3 form a current mirror. The connection structure of the devices in FIG. 4 will be described below.

A source of the transistor TP1 is connected to the first power voltage Vdd. A drain of the transistor TP1 is connected to a drain of the transistor TN1, forming the output terminal of the feedforward circuit 240 to output a feedforward signal Sf. A gate of the transistor TP1 is connected to a gate of the transistor TP2. A source of the transistor TP2 is connected to the first power voltage Vdd. A drain of the transistor TP2 is connected to its gate, and also connected to a second terminal of the capacitor C1. The connection point between the second terminal of the capacitor C1 and the drain and gate of the transistor TP2 is denoted as node A. A first terminal of the capacitor C1 is connected to the input voltage Vin. The first terminal of the capacitor C2 is connected to the input voltage Vin. The second terminal of the capacitor C2 is connected to the output terminal of the current source Is1. An input terminal of the current source Is1 is connected to the first power voltage Vdd. A connection point between the output terminal of the current source Is1 and the capacitor C2 is denoted as node B. The current source Is2 is connected between node A and the second power voltage Vss. An input terminal of the current source Is2 is connected to node A. An output terminal of the current source Is2 is connected to the second power voltage Vss. A source of the transistor TN1 is connected to the second power voltage Vss. A gate of the transistor TN1 is connected to a gate of the transistor TN3. A drain of the transistor TN3 is connected the node B. A source of the transistor TN3 is connected the second power voltage Vss.

In FIG. 4, the transistors TP1 and TP2 are connected to form a current mirror structure. In order that a jumping change from high to low of the input voltage Vin can change a current flowing through the transistors TP1 and TP2, the source of the transistor TP1 and the source of the transistor TP2 can be connected to a first power voltage Vdd higher than Vin. For example, the output voltage Vout may be used as the first power voltage Vdd. The second power voltage Vss typically is a ground voltage. The transistor TN1 and TN3 are connected to form a current mirror structure.

In the case where the input voltage has no change, current source Is1 makes the node B generate a voltage, which is for example equal to the offset voltage of the transistor TN3. The voltage at the node B puts the transistor TN3 in a weak turn-on state, and the transistor TN1, with which the transistor TN3 forms a current mirror, is also in a weak turn-on state. In the transistor TN1 which is in the weak turn-on state, there is for example a current of tens of nanoamps. Similarly, the current source Is2 generates a voltage at the node A, which is for example equal to a difference between the first power voltage Vdd and an offset voltage Vgs of the transistor TP2, that is (Vdd−Vgs). The voltage at the node A puts the transistor TP2 in a weak turn-on state, and the transistor TP1, with which the transistor TP2 forms a current mirror, is also in a weak turn-on state. In the transistor TP1 which is in a weak turn-on state, there is also for example a current of tens of nanoamps. The weak turn-on state in the present disclosure can include a condition where a transistor is on, but close to a turn-off state, such that a transistor may respond quickly to a change of the input voltage Vin, and the transistor itself may not consume too much energy.

When the input voltage Vin changes from high to low, the voltage at the node A is pulled down under a function of the capacitor C1, and a current flowing through the transistor TP2 is increased. Accordingly, a current flowing through the transistor TP1 is increased. Therefore, when the input voltage Vin changes from high to low, an outflowing current signal, i.e. a feedforward signal Sf, is generated along a path from the capacitor C1 to the transistor TP2 and to the transistor TP1. Under a function of the feedforward signal Sf, a voltage of the compensation signal COMP in the drive control circuit 230 is raised immediately or sufficiently rapidly. A duty cycle of the drive signal Sd output by the drive control circuit 230 is increased, making a current of the inductor 211 in the voltage conversion circuit 210 increase quickly. The current increase of the inductor 211 makes the input power of the voltage converter quickly increase to a value before the input voltage Vin is decreased, thereby reducing the decrease of the output voltage caused by the decrease of the input voltage Vin.

When the input voltage Vin changes from low to high, under a function of the capacitor C2, the voltage at the node B is increased, and a current flowing through the transistor TN3 increases. Since the transistors TN1 and TN3 form a current mirror, a current flowing through the transistor TN1 is increased. Therefore, when the input voltage Vin changes from low to high, an inward discharging current signal, i.e. a feedforward signal Sf, is generated through a path from the capacitor C2 to the transistor TN3 and to the transistor TN1. Under a function of the feedforward signal Sf, a voltage of the compensation signal COMP in the drive control circuit 230 is immediately or sufficiently rapidly decreased. The duty cycle of the drive signal Sd output by the drive control circuit 230 is lowered, which reduces a current of the inductor 211 in the voltage conversion circuit 210 quickly. The current reduction of the inductor 211 makes the input power of the voltage converter quickly decrease to a value before the input voltage Vin is increased, thereby reducing the increase of the output voltage caused by the increase of the input voltage Vin.

In FIG. 4, the change of the feedforward signal Sf caused by the change of the input voltage Vin is proportional to a quantity and a rate of the change in the input voltage Vin. Therefore, the feedforward circuit 240 in FIG. 4 may properly adjust an amplitude and a rate of the change of the compensation signal COMP in the drive control circuit 230 according to the change of the input voltage Vin. Accordingly, the feedforward circuit 240 allows the output voltage to maintain favorable linear state even if the input voltage changes.

When the input voltage Vin changes from low to high, the capacitor C2, the current source Is1, the transistor TN3 and the transistor TN1 work together to restrain a fluctuation of the output voltage Vout caused by the change from low to high. When the input voltage Vin changes from high to low, the capacitor C1, the current source Is2, the transistor TP2 and the transistor TP1 work together to restrain a fluctuation of the output voltage Vout caused by the change from high to low. Accordingly, when the input voltage Vin does not change from high to low, the capacitor C1, the current source Is2, the transistor TP2 and the transistor TP1 may be omitted from the feedforward circuit; when the input voltage Vin does not change from low to high, the capacitor C2, the current source Is1, the transistor TN3 and the transistor TN1 may be omitted from the feedforward circuit.

When there is no change in the input voltage Vin, the current source Is1 puts the transistor TN1 in a weak turn-on state. Thus, when the input voltage Vin changes from low to high, the transistor TN3 and TN1 can respond quickly to generate a feedforward signal Sf. Therefore, the current source Is1 speeds up a response speed of the feedforward circuit 240 to the input voltage Vin. When it is unnecessary for the feedforward circuit to quickly respond to the change of the input voltage Vin, for example when the input voltage Vin changes slowly from low to high, the current source Is1 may be omitted. Similarly, when there is no change in the input voltage Vin, the current source Is2 puts the transistor TP1 in a weak turn-on state. Thus, when the input voltage Vin changes from high to low, the transistor TP2 and TP1 can respond quickly to generate a feedforward signal Sf. Therefore, the current source Is1 speeds up the response rate of the feedforward circuit 240 to the input voltage Vin. When it is unnecessary for the feedforward circuit 240 to quickly respond to the change of the input voltage Vin, for example when the input voltage Vin changes slowly from high to low, the current source Is2 may be omitted.

Figure 5:
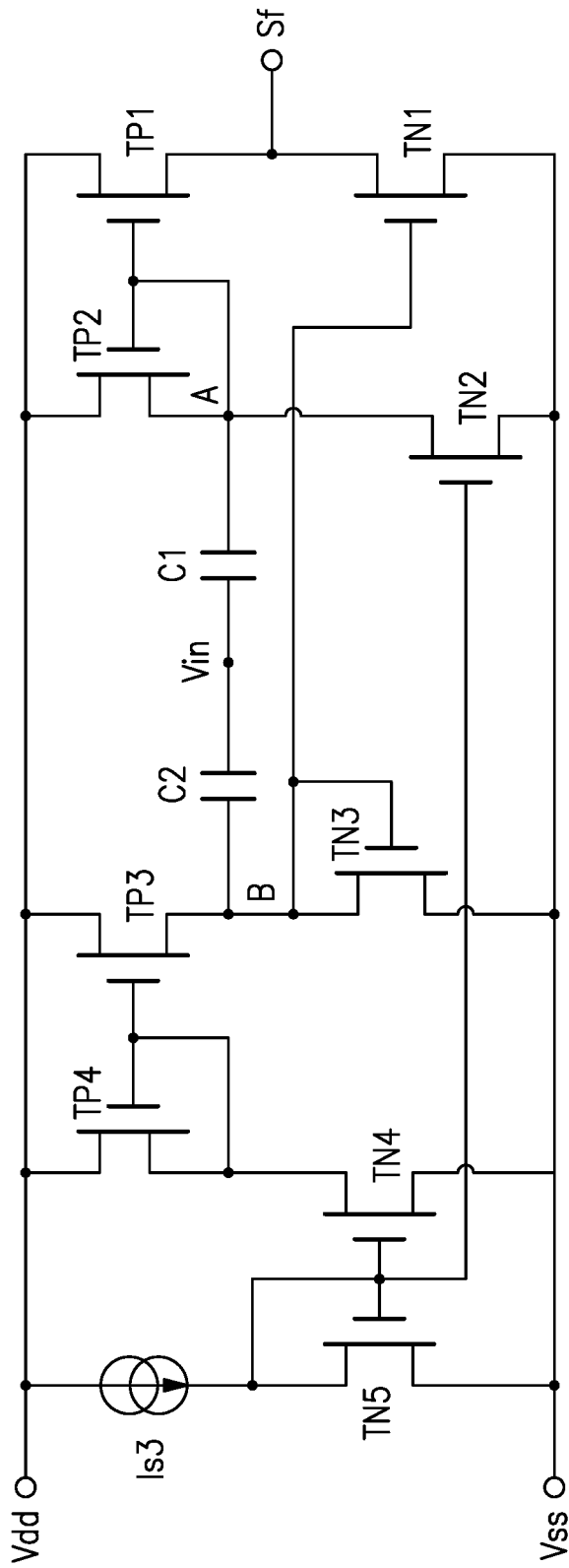
FIG. 5 is a circuit diagram schematically illustrating another example structure of a feedforward circuit.

FIG. 5 is a circuit diagram schematically illustrating another example structure of a feedforward circuit 240 in FIG. 3. In FIG. 5, the same reference numerals are adopted for the same devices as in FIG. 4. The P-type transistors TP1 and TP2, the N-type transistors TN1 and TN2, the capacitors C1 and C2 are respectively identical to those in FIG. 4, and can be referred to the connection relationship and functions described in reference to FIG. 4.

FIG. 5 differs from FIG. 4 in that the feedforward circuit 240 in FIG. 5 includes P-type transistors TP3 and TP4, N-type transistors TN2, TN4 and TN5, and a current source Is3, which replace the current sources Is1 and Is2 in FIG. 4. In FIG. 5, the P-type transistor TP3 and TP4 form a current mirror structure, and the N-type transistor TN4 and TN5 form a current mirror structure.

A source of the transistor TP3 is connected to the first power voltage Vdd. A drain of the transistor TP3 is connected to the node B. A gate of the transistor TP3 is connected to a gate of the transistor TP4. A source the transistor TP4 is connected to the first power voltage Vdd. A drain of the transistor TP4 is connected to a source of the transistor TN4. The source of the transistor TN4 is connected to a second power voltage Vss. A gate of the transistor TN4 is connected to a gate of the transistor TN5. A drain of the transistor TN5 is connected to its gate, and connected to the first power voltage Vdd via the current source Is3. A drain of the transistor TN5 is connected to the second power voltage Vss. A drain of the transistor TN2 is connected to the node A. A gate of the transistor TN2 is connected to a gate of the transistor TN5. A source of the transistor TN2 is connected to the second power voltage Vss.

In FIG. 5, the current source Is3 puts the transistor TN5 in an offset state, and the transistor TN4, with which TN5 forms a current mirror, is weakly turned on, which weakly turns on the transistor TP4 and TP3, thereby generating a voltage at the node B (e.g., equal to the offset voltage of the transistor). Furthermore, the transistor TN5 in an offset state typically puts the transistor TN2 in a weak turn-on state, and generates a voltage at the node A. The voltage at the node A is for example equal to a difference between the first power voltage Vdd and an offset voltage Vgs of the transistor, i.e. (Vdd−Vgs). Therefore, the transistors TP3, TP4, TN2, TN4 and TN5, and the current source Is3 in FIG. 5 make a voltage generated respectively at the node A and node B in the feedforward circuit 240, thereby making it possible to quickly generate a feedforward signal Sf when the input voltage Vin changes.

Similar to that in FIG. 4, in a situation when there is no change in the input voltage Vin, a voltage at the node B puts the transistors TN3 and TN4 in a weak turn-on state; a voltage at the node A puts the transistor TP2 and TP1 in a weak turn-on state. When the input voltage Vin changes from high to low, the voltage at the node A is pulled down under a function of the capacitor C1, and a current flowing through the transistor TP1 and TP2 increases, thereby an outflowing current signal is generated at the output terminal of the feedforward circuit 240, i.e. a feedforward signal Sf. The feedforward signal Sf quickly increases the current of the inductor 211 in the voltage conversion circuit 210, so as to reduce the decrease of the output voltage caused by the decrease of the input voltage Vin. When the input voltage Vin changes from low to high, under the function of the capacitor C2, the voltage at the node B is raised, and a current flowing through the transistors TN3 and TN1 increases, thereby an inward discharging current signal is generated at the output terminal of the feedforward circuit 240, i.e. a feedforward signal Sf. The feedforward signal Sf quickly decreases the current of the inductor 211 in the voltage conversion circuit 210, so as to reduce the increase of the output voltage caused by the increase of the input voltage Vin.

Figure 6:
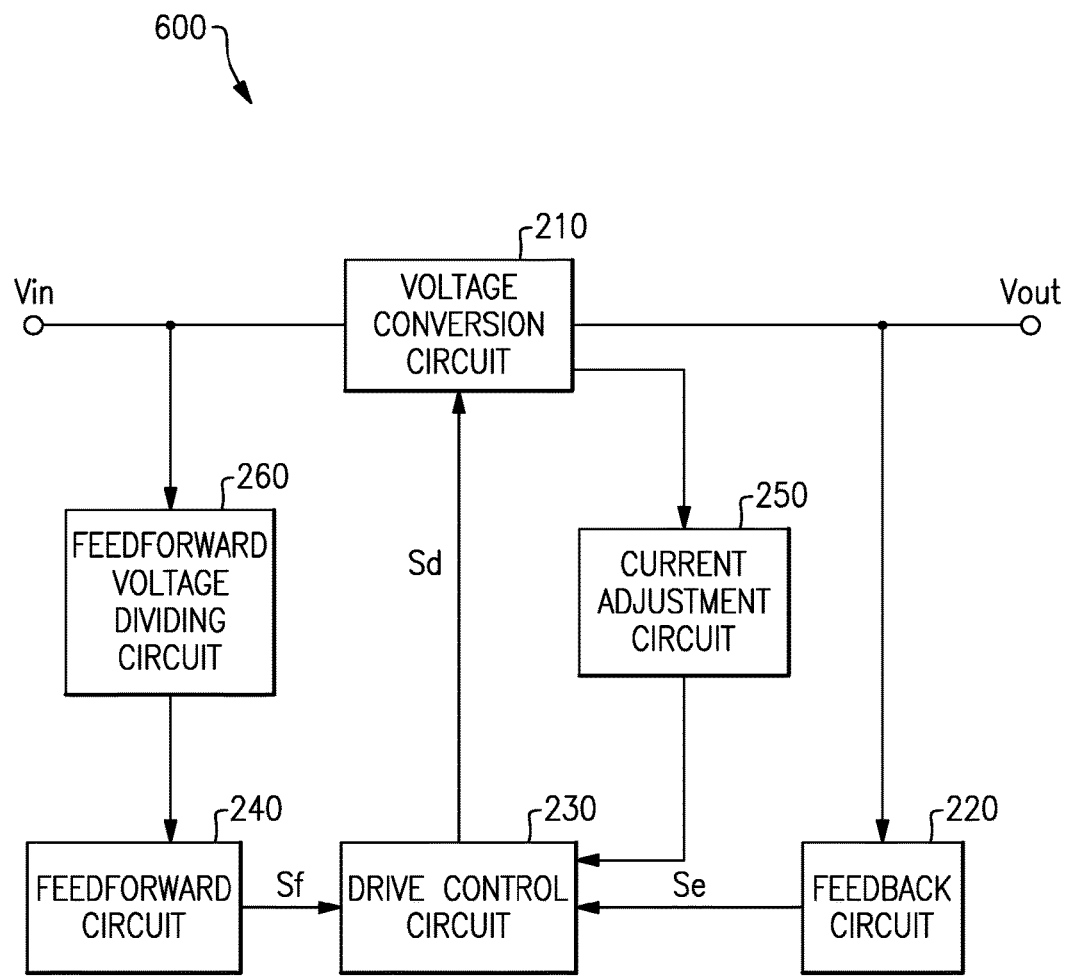
FIG. 6 is a block diagram schematically illustrating a second voltage converter according to an embodiment of the present disclosure.

FIG. 6 is a block diagram schematically illustrating a second example of a voltage converter 600 according to an embodiment of the present disclosure. In FIG. 6, the same circuits and devices as those in FIG. 2 are denoted with the same reference numerals, and can be referred to the above description in reference to FIGS. 2-5. Compared with the first example voltage converter 200 in FIG. 2, a current adjustment circuit 250 and a feedforward voltage dividing circuit 260 are added in the second example voltage converter 600 in FIG. 6.

The current adjustment circuit 250 makes the voltage converter 600 of FIG. 6 operate in a current mode. However, the voltage converter 200 in FIG. 2 operates in a voltage mode. The current adjustment circuit 250 is used for sensing an inductance current in the voltage conversion circuit 210, generates an indication signal Sc for indicating the inductance current based on the sensed inductance current, and provides the indication signal Sc to the drive control circuit 230. The inductance current in the voltage conversion circuit 210 directly affects the output voltage of the second voltage converter 600, thus the indication signal Sc for indicating the inductance current can be used for driving a control device in the voltage converter, so as to obtain a desired output voltage Vout.

The drive control circuit 230 generates a drive signal Sd for driving the voltage conversion circuit 210 based on the error signal Se from the feedback circuit 220, the feedforward signal Sf from the feedforward circuit 240 and the indication signal Sc from the current adjustment circuit 250. The drive signal Sd is provided to a control device for controlling the charging and discharging operation in the voltage conversion circuit 210.

In the case where the voltage conversion circuit 210 in the voltage converter 600 of FIG. 6 is a buck conversion circuit or a boost-buck conversion circuit, the output voltage Vout may be lower than the input voltage Vin. In this case, the feedforward circuit 240 may be unable to detect the voltage value of the input voltage Vin, thereby unable to operate. Thus, a feedforward voltage dividing circuit 260 may be set before the feedforward circuit 240. The feedforward voltage dividing circuit 260 divides the input voltage Vin and obtains a reduced voltage Vin_div which is lower than the input voltage Vin, and then provides the reduced voltage Vin_div to the feedforward circuit 240. It should be noted that in the case of adopting the feedforward voltage dividing circuit 260, the input voltage Vin located between the capacitor C1 and the capacitor C2 in FIG. 4 and FIG. 5 is replaced with the reduced voltage Vin_div.

Figure 7A:
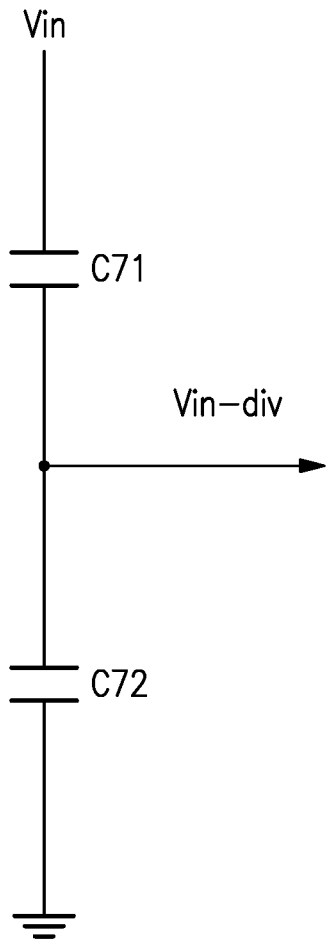
FIG. 7A schematically illustrates a first example of the feedforward voltage dividing circuit in FIG. 6.

FIG. 7A schematically illustrates a first example of the feedforward voltage dividing circuit in FIG. 6. The feedforward voltage dividing circuit in FIG. 7A is a capacitive voltage dividing circuit. The capacitive voltage dividing circuit includes two capacitors C71 and C72 connected in series. A first terminal of the capacitor C71 is connected to the input voltage Vin. A second terminal of the capacitor C71 is connected to a first terminal of the capacitor C72, and the reduced voltage Vin_div is led out at a connection node between the capacitor C71 and the capacitor C72. A second terminal of the capacitor C72 is connected to a ground. The reduced voltage Vin_div may be obtained by a following Equation (1):

$$\text{Vin\_div} = Vin \times \frac{C71}{C71 + C72}. \quad \text{Equation (1)}$$

That is to say, a ratio of the reduced voltage Vin_div to the input voltage is equal to a ratio of a capacitance value of the capacitor C71 to a sum of the capacitance value of the capacitor C71 and a capacitance value of C72.

Figure 7B:
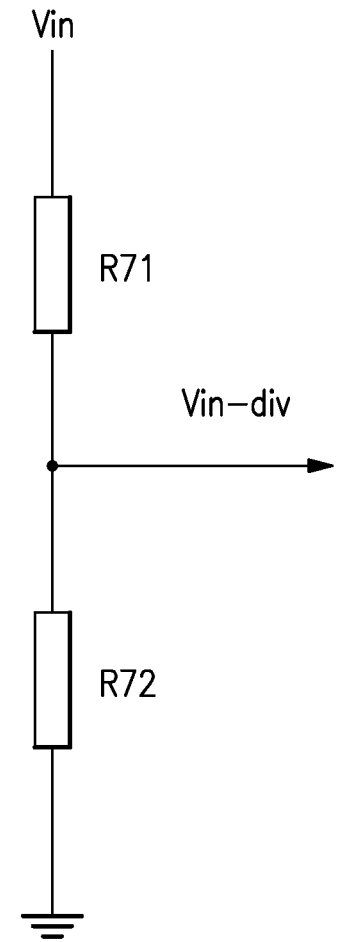
FIG. 7B schematically illustrates a second example of the feedforward voltage dividing circuit in FIG. 6.

FIG. 7B schematically illustrates a second example of the feedforward voltage dividing circuit in FIG. 6. The voltage dividing circuit in FIG. 7B is a resistive voltage dividing circuit. The resistive voltage dividing circuit includes two resistors R71 and R72 connected in series. A first terminal of the resistor R71 is connected to the input voltage Vin. A second terminal of the resistor R71 is connected to a first terminal of the resistor R72, and the reduced voltage Vin_div is led out at a connection node between the resistors R71 and R72. A second terminal of the resistor R72 is connected to a ground. The reduced voltage Vin_div may be obtained by the following Equation (2):

$$\text{Vin\_div} = Vin \times \frac{R72}{R71 + R72}. \quad \text{Equation (2)}$$

That is to say, a ratio of the reduced voltage Vin_div to the input voltage is equal to a ratio of a resistance value of the resistor R71 to a sum of the resistance value of the resistor R71 and a resistance value of R72. It should be noted that the voltage divider 221 in the feedback circuit 220 in FIG. 3 may be implemented by using any of the circuits in FIG. 7A and FIG. 7B.

Figure 8:
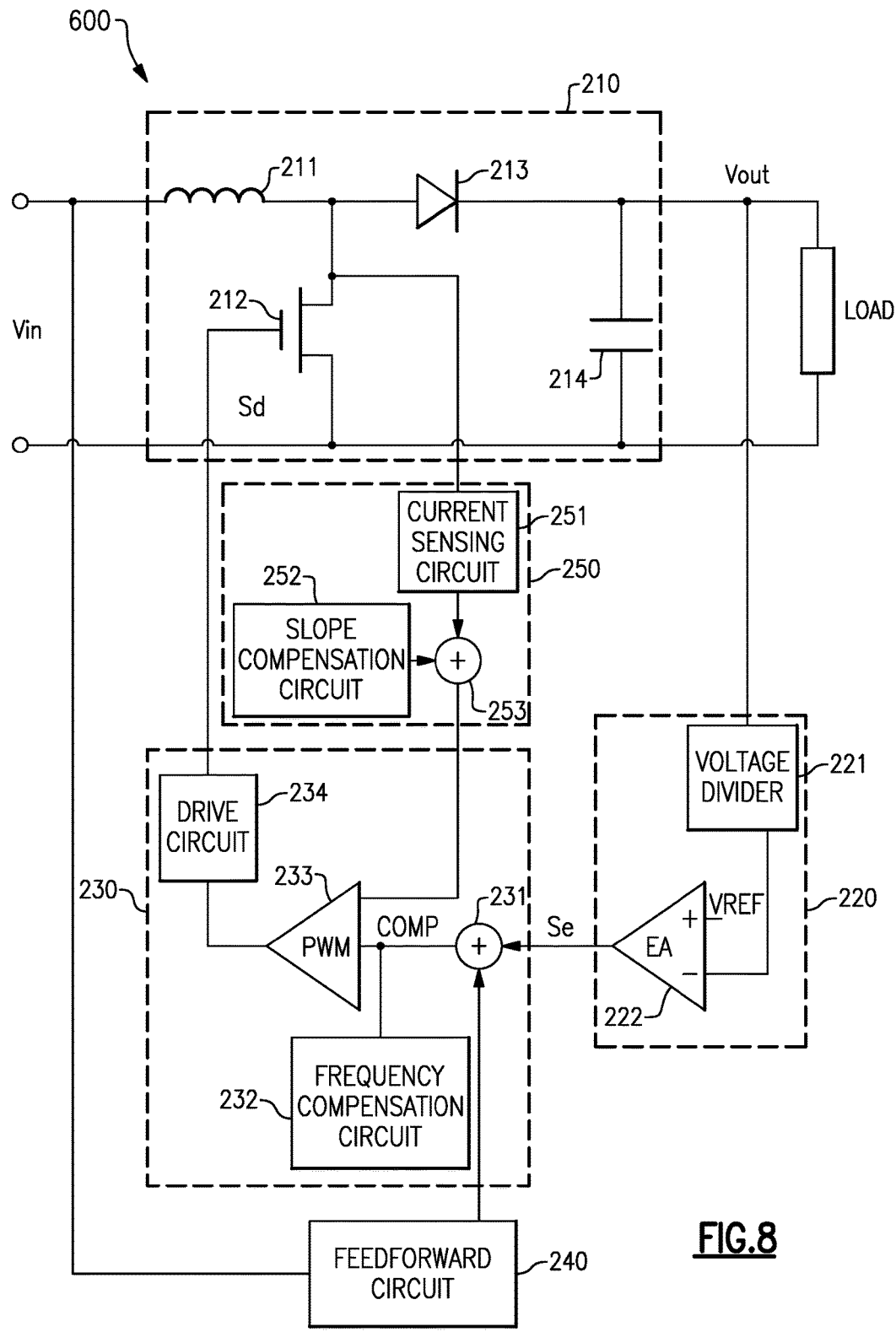
FIG. 8 schematically illustrates an example implementation of the second voltage converter in FIG. 6.

FIG. 8 schematically illustrates a more specific example implementation of the voltage converter 600 of FIG. 6. In FIG. 8, circuits and devices the same as those in FIG. 3 are denoted with the same reference numerals, and can be referred to the descriptions in connection with FIGS. 3-5. The voltage conversion circuit 210 in FIG. 8 is a boost converter, which is the same as that in FIG. 3. Accordingly, no feedforward voltage dividing circuit 260 has been set in FIG. 8.

The voltage converter in FIG. 8 is a converter operating in a current mode, whereas the voltage converter in FIG. 3 is a converter operating in a voltage mode. Accordingly, compared with FIG. 3, a current adjustment circuit 250 is added into the voltage converter in FIG. 8.

The current adjustment circuit 250 is used for sensing an inductance current in the voltage conversion circuit 210, generating an indication signal Sc for indicating the inductance current and providing it to the drive control circuit 230. As shown in FIG. 8, the current adjustment circuit 250 includes a current sensing circuit 251, a slope compensation circuit 252 and an adder 253.

The current sensing circuit 251 is connected to the inductor 211 in the voltage conversion circuit 210, and used for sensing an inductance current flowing through the inductor 211. The slope compensation circuit 252 is used for generating a slop compensation signal, which can implement slop compensation for the sensed inductance current to avoid generating secondary slope oscillation in the voltage converter 600. Thereafter, the inductance current sensed by the current sensing circuit 251 is added to the slope compensation signal generated by the slope compensation circuit 252 by the adder 253, so as to generate a slope-compensated inductance current. The slope-compensated inductance current is for example a sawtooth waveform signal. The sawtooth waveform signal determines a duty cycle of the voltage conversion circuit 210. The current adjustment circuit 250 shown in FIG. 8 is an example. The current adjustment circuit 250 may also be implemented in other configurations.

The slope-compensated inductance current is provided to the drive control circuit 230, for example to the PWM circuit 233 for pulse width modulation, so as to output a drive signal Sd. The circuit adjustment circuit 250 and the drive control circuit 230 form a current loop. When the input voltage Vin changes, a current in the current loop changes substantially immediately or sufficiently quickly, thus the duty cycle of the voltage conversion circuit is adjusted, so as to adjust the output voltage.

Figure 9A:
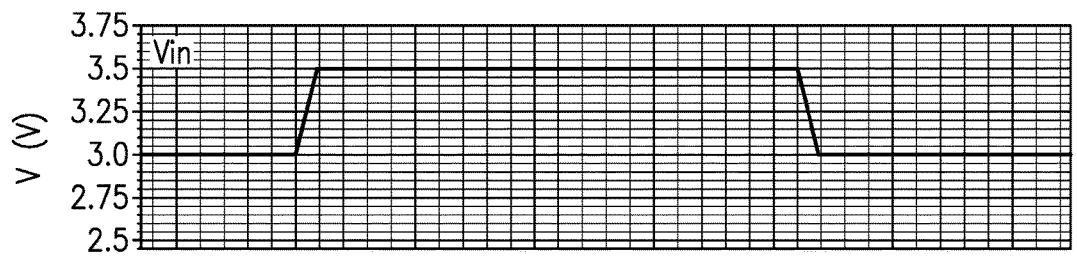
FIGS. 9A-9D schematically illustrate simulation results of voltage conversion performed by the second voltage converter in FIG. 8.
Figure 9B:
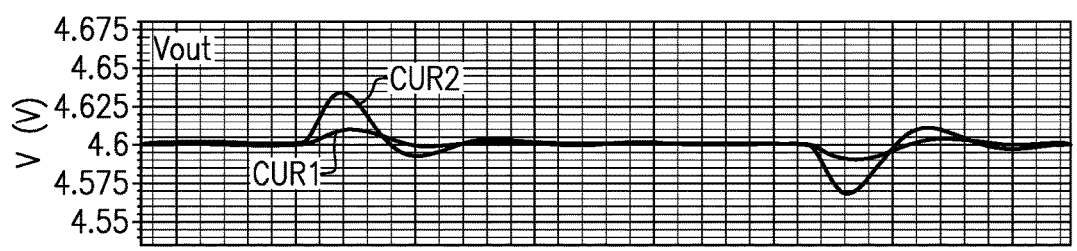
Figure 9C:
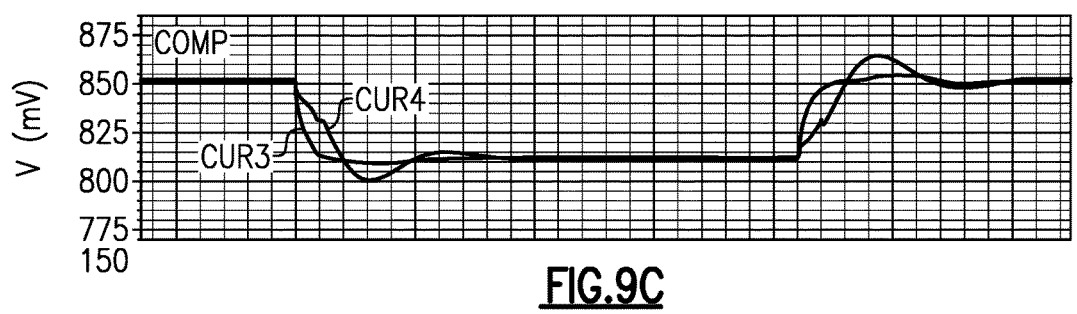
Figure 9D:
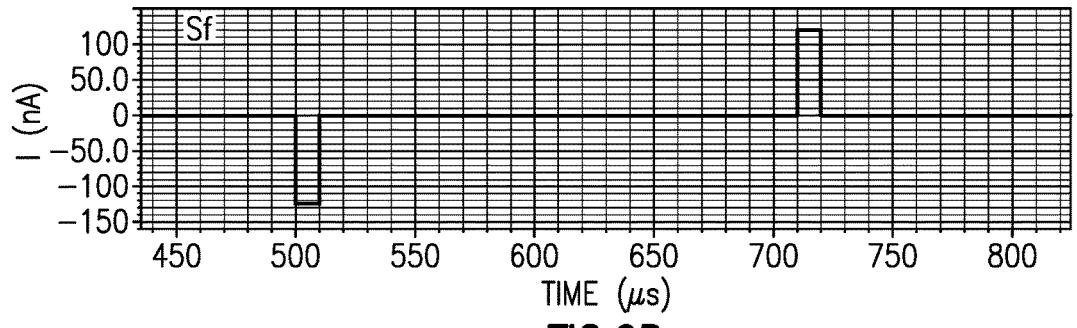

FIGS. 9A-9D illustrate examples of simulation results of voltage conversion using the voltage converter 600 of FIG. 8. The feedforward circuit 240 in the voltage converter in FIG. 8 has the same circuit structure as that shown in FIG. 5. In FIGS. 9A-9D, signal waveforms of four monitoring points are shown. More particularly, a voltage waveform of the input voltage Vin is shown in FIG. 9A; a voltage waveform of the output voltage Vout is shown in FIG. 9B; a voltage waveform of the compensation signal COMP obtained after frequency-compensation is shown in FIG. 9C; a current waveform of the feedforward current Sf output from the feedforward circuit 240 is shown in FIG. 9D.

In FIG. 9A, a horizontal axis is a time in microsecond, and a vertical axis is a voltage value of the input voltage Vin in millivolt. As shown in FIG. 9A, the input voltage Vin has a voltage increase from 3 v to 3.5 v at a time of 500 ms, and has a voltage decrease from 3.5 v to 3 v at a time of 710 ms.

In FIG. 9B, a horizontal axis is time in microsecond, and a vertical axis is a voltage value of the compensation voltage Vout in millivolt, in which two curves are illustrated, i.e. curve CUR1 and curve CUR2. The curve CUR1 is an output voltage Vout obtained from a voltage conversion performed by the voltage converter 600 in FIG. 8. The curve CUR2 is an output voltage Vout obtained from the voltage conversion performed by the voltage converter 600 in FIG. 8 with the feedforward circuit 240 removed. That is, the feedforward circuit 240 and the adder 231 are removed from the voltage converter 600 in FIG. 8 and the error signal Se output by the feedback circuit is performed frequency compensation directly to be provided to the PWM circuit 233. It can be seen from FIG. 9B that, during the voltage increase of the input voltage Vin, there is a notable increase in the curve CUR2 which is from 4.6 v to 4.635 v, whereas the increase in the curve CUR1 is notably reduced, which is merely from 4.6 v to 4.61 v; during the decrease of the input voltage Vin, there is a notable decrease in the curve CUR2 which is from 4.6 v to about 4.57 v, whereas the decrease in the curve CUR1 is notably reduced, which is merely from 4.6 v to about 4.59 v. Therefore, while the feedforward circuit 240 is added into the voltage converter, the output voltage Vout can be relatively stably maintained at a target voltage of 4.6 v with a favorable linear state, even if the input voltage Vin changes.

In FIG. 9C, a horizontal axis is a time in microsecond, and a vertical axis is a voltage value of the compensation signal COMP in volt, in which two curves are illustrated, i.e. curve CUR3 and curve CUR4. The curve CUR3 is a compensation signal COMP in the case of implementing voltage conversion by the voltage converter 600 in FIG. 8. The curve CUR4 is a compensation signal COMP in the case of removing the feedforward circuit 240 from the voltage converter 600 in FIG. 8.

It can be seen from FIG. 9C that during the increasing period of the input voltage Vin from 500 ms to 510 ms, the CUR3 with the feedforward circuit 240 included quickly decreases during the increasing period from 500 ms to 510 ms to compensate for an increase of the input voltage; whereas a descending process of the CUR4 without the feedforward circuit 240 continues from 500 ms until 530 ms, and increases during a period from 530 ms to 550 ms due to too much decrease, i.e. the compensation process in the curve CUR4 continues from 500 ms until 550 ms, which greatly lags behind the timing of 510 ms.

It can be further seen from FIG. 9C that, during the decreasing period of the input voltage Vin from 710 ms to 720 ms, the CUR3 with the feedforward circuit 240 included quickly increases during the decreasing period from 710 ms to 720 ms to compensate for an increase of the input voltage; whereas an increasing process of the CUR4 without the feedforward circuit 240 included continues from 710 ms until 730 ms, and decrease during a period from 730 ms to 760 ms due to too much increase, i.e. a compensation process in the curve CUR4 continues from 710 ms until 760 ms, which greatly lags behind the timing of 720 ms. Thus, after the feedforward circuit 240 has been added, the voltage converter has favorable transient response characteristic when the input voltage Vin changes.

In FIG. 9D, a horizontal axis is a time in microsecond, and a vertical axis is a current value of the feedforward signal Sf in microamp. As shown in FIG. 9D, during the increasing period of the input voltage Vin from 500 ms to 510 ms, a current value of the feedforward signal Sf generates a decrease pulse, which makes the voltage of the compensation signal COMP immediately decrease and the current of the inductor 211 in the voltage conversion circuit 210 quickly reduce, so as to reduce an increase of the output voltage Vout caused by an increase of the input voltage Vin. During the decreasing period of the input voltage Vin from 710 ms to 720 ms, the current value of the feedforward signal Sf generates an increase pulse, which makes a voltage of the compensation signal COMP immediately increase and the current of the inductor 211 in the voltage conversion circuit 210 quickly increase, so as to reduce a decrease of the output voltage Vout caused by the decrease of the input voltage Vin.

Figure 10:
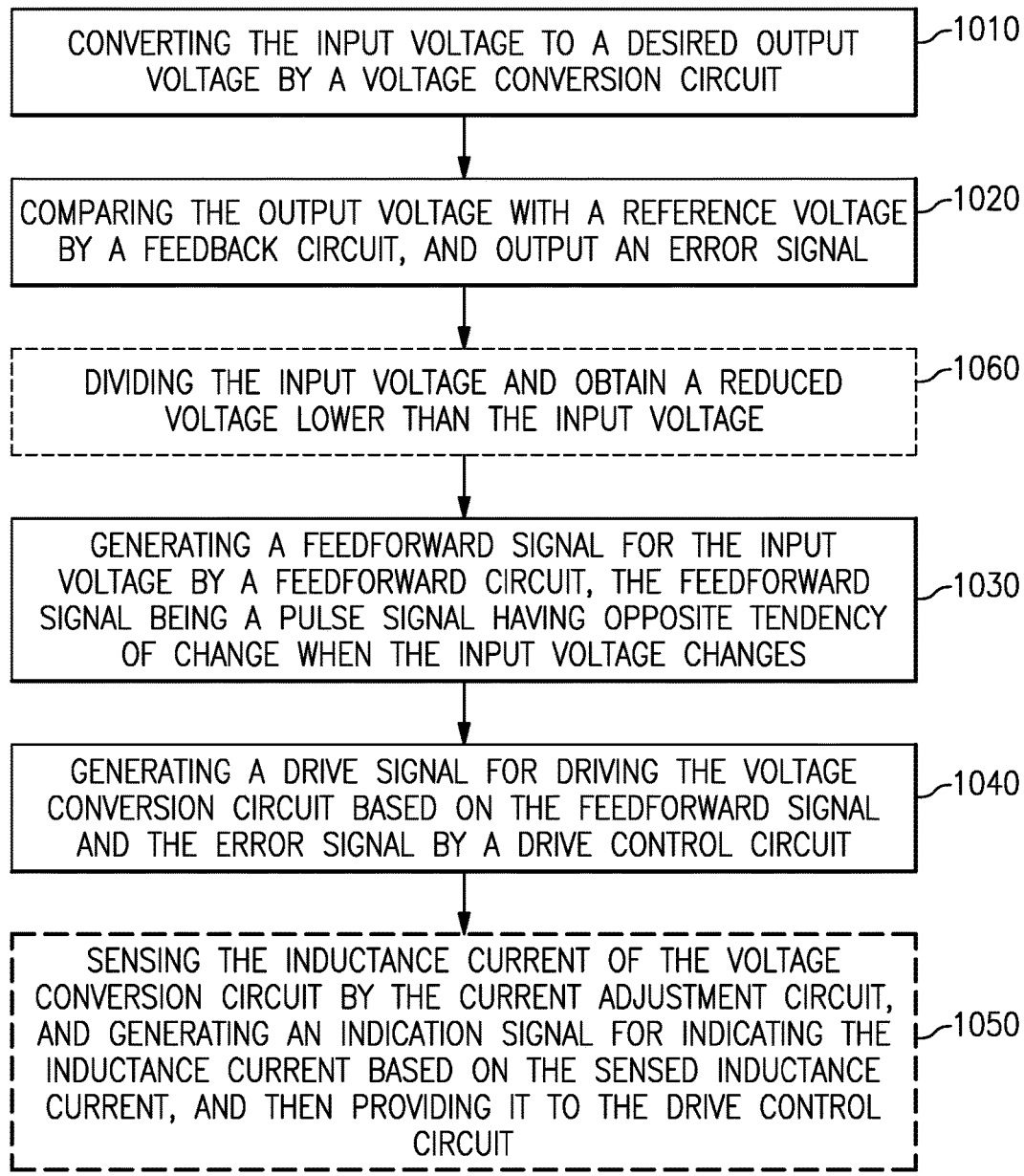
FIG. 10 is a flowchart schematically illustrating a voltage conversion method according to an embodiment of the present disclosure.

FIG. 10 is a flowchart illustrating a voltage conversion method 1000 according to an embodiment of the present disclosure. The voltage conversion method 1000 may be applied to the voltage converter as shown in FIG. 2, and can be referred to the above description in connection with FIGS. 2 to 5. The voltage converter may include a voltage conversion circuit, a feedback circuit, a drive control circuit and a feedforward circuit. The voltage conversion circuit and the feedforward circuit receive the input voltage. The voltage conversion circuit implements voltage conversion to the input voltage and output an output voltage, which is then provided to the feedback circuit. As shown in FIG. 10, the voltage conversion method 1000 may comprise steps S1010 to S1050.

In the step S1010, the input voltage is converted into a desired output voltage by the voltage conversion circuit. The converted output voltage may be either higher or lower than the input voltage.

In S1020, the output voltage is compared with a reference voltage by the feedback circuit, and an error signal is output. The reference voltage corresponds to a target voltage to be output by the voltage converter. The error signal is used for indicating a difference between the output voltage and a target voltage to be output by the voltage converter.

In S1030, a feedforward signal for the input voltage is generated by a feedforward circuit based on the input voltage, and the feedforward signal can be, for example, a pulse signal having tendency of change opposite to a change of the input voltage. For example, when the input voltage increases from a first voltage to a second voltage, the second voltage is higher than the first voltage, and feedforward signal may generate a decrease pulse; when the input voltage decreases from the second voltage to the first voltage, the feedforward signal may generate an increasing pulse. When the input voltage stays unchanged, the feedforward circuit outputs a constant feedforward signal.

In S1040, a drive signal for driving the voltage conversion circuit is generated by the drive control circuit based on the feedforward signal and the error signal. The drive signal is used for controlling a charging operation and a discharging operation of the voltage conversion circuit.

Furthermore, in the case where the voltage converter to which the voltage conversion method 1000 is applied operates in a current mode, the voltage converter further comprises a current adjustment circuit as shown in FIG. 6, and the voltage conversion method 1000 may further comprise: sensing a inductance current of the voltage conversion circuit by the current adjustment circuit, and generating an indication signal for indicating the inductance current based on the sensed inductance current, which is then provided to the drive control circuit (S1050), as shown with a dotted line in FIG. 10. Since the inductance current in the voltage conversion circuit directly affects the output voltage of the voltage converter, the indication signal for indicating the inductance current can be used for driving the voltage conversion circuit, so as to obtain a desired output voltage.

Accordingly, in S1040, a drive signal for driving the voltage conversion circuit is generated by the drive control circuit based on the feedforward signal, the error signal and the indication signal for indicating the inductance current.

In the case where the voltage conversion circuit in the voltage converter is a buck conversion circuit or a boost-buck conversion circuit, the output voltage may be lower than the input voltage. In this case, the feedforward circuit may be unable to detect a voltage value of the input voltage. Accordingly, before a feedforward signal for the input voltage is generated by using the feedforward circuit based on the input voltage in S1030, it may be further included in the voltage conversion method 1000 where the input voltage is divided and a reduced voltage lower than the input voltage is obtained (S1060), as shown in FIG. 10. Thereafter, in S1030, a feedforward signal for the input voltage is generated based on the reduced voltage. The feedforward signal can be, for example, a pulse signal having opposite tendency of change when the input voltage changes.

The particular structure of the voltage converter in according to the embodiment of the present disclosure, to which the voltage conversion method 1000 is applied, may refer to the illustration in FIG. 2 to FIG. 8 and the relevant descriptions. An order of the steps in FIG. 10 is an example, and may not constitute limitation to the embodiment of the present disclosure.

In the voltage conversion method 1000 according to the embodiment of the present disclosure, the jumping change of the input voltage is quickly converted into a feedforward signal by using a feedforward circuit to control the operation of the voltage converter, which improves a transient response characteristic of the voltage converter. Accordingly, the output voltage can be maintained in favorable linear state even if the input voltage changes.

Those skilled in the art may clearly understand that, for convenience and simplicity of the description, the specific implementations of the method embodiment described above can refer to corresponding process in the preceding product embodiments.

Those skilled in the art can realize that, devices and algorithm steps of the examples described with reference to the embodiments disclosed in the disclosure may be implemented through electronic hardware, or a combination of the electronic hardware and software. As for each specific application realization, a person skilled in the art can use different manner to implement the described functions, but such implementations should not be considered to go beyond the scope of the present disclosure.

Principles and advantages of technical solutions described above are applicable to any voltage converter. The voltage converter can be applied in a variety of electronic apparatus. The electronic apparatus may include, but is not limited to, a consumer electronic product, a portion of a consumer electronic product, an electronic test equipment etc. The consumer electronic product may include, but is not limited to, a smart phone, a TV, a tablet computer, a monitor, a personal digital assistant, a camera, an audio player, a memory etc. A portion of the consumer electronic product may include a multi-chip module, a power amplifier module, a voltage converter etc.

Figure 11:
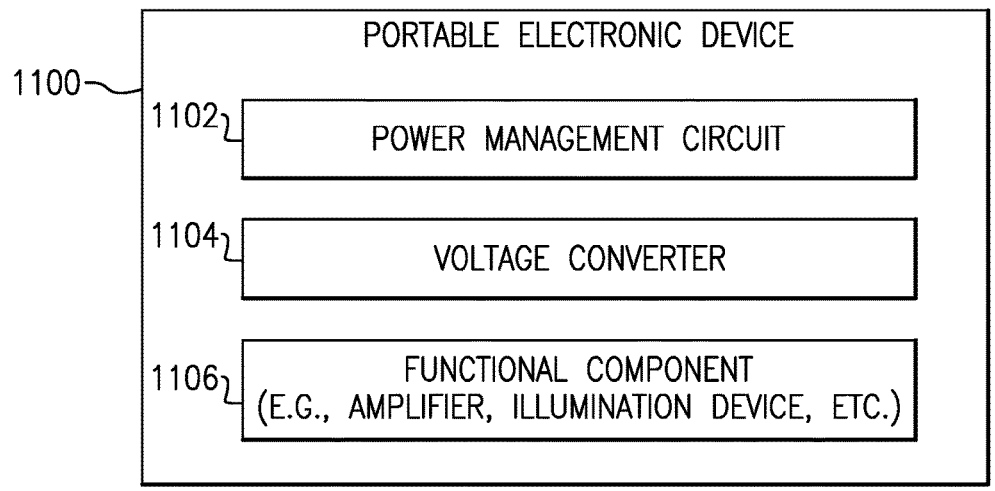
FIG. 11 is a block diagram of a portable electronic device that includes a voltage converter having one or more features as described herein.

For example, FIG. 11 shows a block diagram of a portable electronic device 1100 that can benefit from one or more features as described herein. Such a portable electronic device can include, for example, a power management circuit 1102 configured to provide a first voltage for operation of the portable electronic device. Such a first voltage can be based on, for example, a battery voltage provided by a battery. The portable electronic device 1100 can also include a functional component 1106 having an electrical load and configured to utilize a second voltage. Such a functional component can be any circuit, device, or any combination thereof, configured to facilitate operation of the portable electronic device 1100. Non-limiting examples of such a functional component are described in reference to FIG. 12.

Referring to FIG. 11, the portable electronic device 1100 can further include a voltage converter 1104 configured to convert the first voltage to the second voltage, to thereby allow operation of the functional component 1106. Such a voltage converter can include one or more features as described herein.

In some implementations, the portable electronic device of FIG. 11 can be a radio-frequency (RF) device such as a wireless device. In some embodiments, such a wireless device can include, for example, a cellular phone, a smartphone, a hand-held wireless device with or without phone functionality, a wireless tablet, etc.

Figure 12:
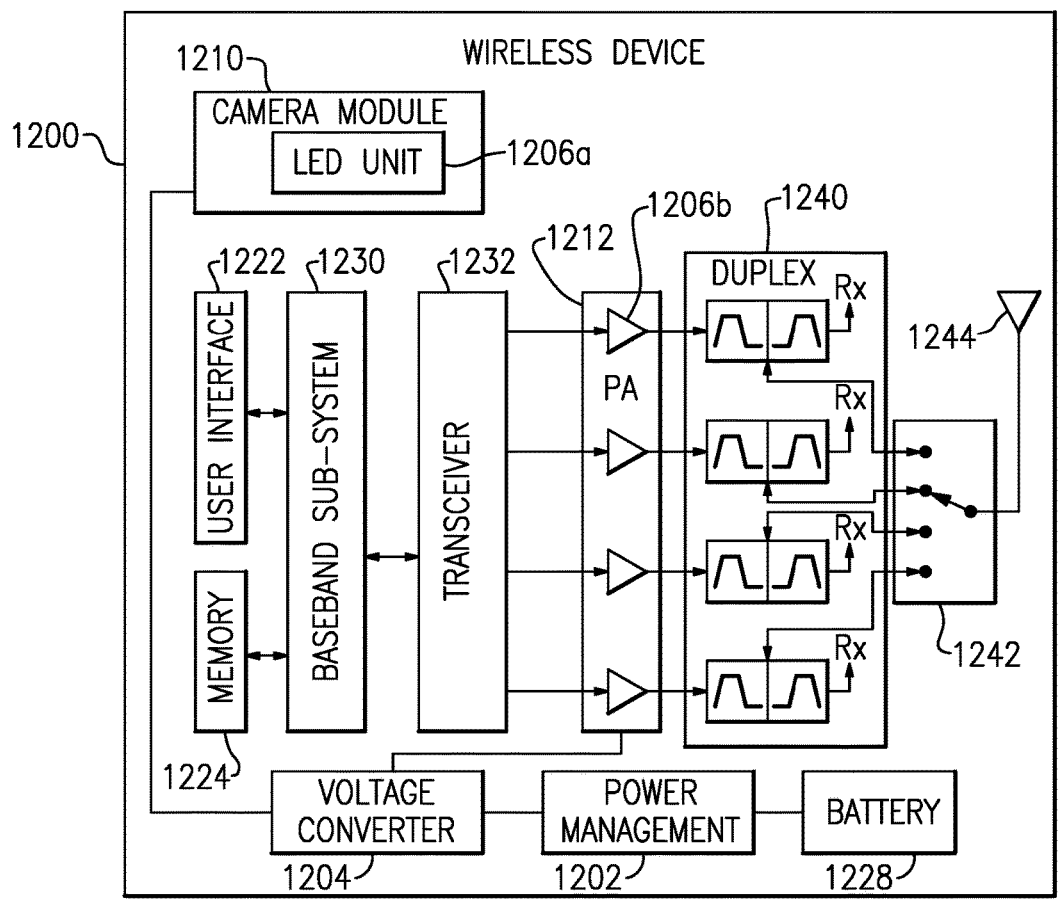
FIG. 12 illustrates a wireless device that can be a more specific example of the portable electronic device of FIG. 11.

FIG. 12 depicts an example wireless device 1200 having one or more advantageous features described herein. In such a wireless device, one or more functional components can include respective electrical load(s), and be provided with an appropriate operating voltage by one or more voltage converters (depicted as 1204) having one or more features as described herein.

For example, a power amplifier (PA) 1206b can be provided with a supply voltage from the voltage converter 1204 to facilitate amplification of an RF signal to be transmitted. In some embodiments, such a PA can be part of a PA module (PAM) 1212.

In another example, a light-emitting diode (LED) illumination unit 1206a can be provided with a supply voltage from the voltage converter 1204 to facilitate operation of a camera module 1210. It will be understood that other functional component(s) of the wireless device 1200 can also utilize the voltage converter 1204.

In the example wireless device 1200 of FIG. 12, a power management circuit 1202 can be provided. Among others, such a circuit can provide an input voltage for the voltage converter 1204, based on power provided by a battery 1228.

In the example wireless device 1200 of FIG. 12, the PAs (e.g., 1206b) can receive their respective RF signals from a transceiver 1232 that can be configured and operated to generate RF signals to be amplified and transmitted, and to process received signals. The transceiver 1232 is shown to interact with a baseband sub-system 1230 that is configured to provide conversion between data and/or voice signals suitable for a user and RF signals suitable for the transceiver 1232.

The baseband sub-system 1230 is shown to be connected to a user interface 1222 to facilitate various input and output of voice and/or data provided to and received from the user. The baseband sub-system 1230 can also be connected to a memory 1224 that is configured to store data and/or instructions to facilitate the operation of the wireless device, and/or to provide storage of information for the user.

In the example wireless device 1200, outputs of the PAs can be matched by a matching network and routed to an antenna 1244 via their respective duplexers 1240 and a band-selection switch 1242. In some embodiments, each duplexer can allow transmit and receive operations to be performed simultaneously using a common antenna (e.g., 1244). In FIG. 12, received signals are shown to be routed to "Rx" paths that can include, for example, one or more low-noise amplifiers (LNAs).

The above described are only specific example implementations of the present disclosure, but the scope of protection of the present disclosure is not limited thereto, and any changes and alternatives that can be easily conceived by those skilled in the art should be encompassed within the protection scope of the present disclosure.

What is claimed is:

1. A voltage converter comprising:
   a voltage conversion circuit configured to convert an input voltage to an output voltage;
   a feedback circuit configured to generate an error signal based on the output voltage and a reference voltage, the error signal utilized to adjust the output voltage;
   a feedforward circuit including a current mirror and configured to generate a feedforward signal based on an operation of the current mirror resulting from a change in the input voltage; and a drive control circuit configured to generate a drive signal for the voltage conversion circuit based at least in part on the feedforward signal.

2. The voltage converter of claim 1 wherein the feedforward circuit further includes an input node having a voltage representative of the input voltage.

3. The voltage converter of claim 2 wherein the current mirror of the feedforward circuit includes first and second transistors arranged in a current-mirror configuration and coupled to the input node, such that the change in the input voltage results in a change in a current flowing through one of first and second transistors, and therefore a corresponding change in a current flowing through the other transistor, the feedforward signal being based on the change in the current flowing through the other transistor.

4. The voltage converter of claim 3 wherein each of the first and second transistors includes a source, a drain, and a gate, the gates of the first and second transistors being connected.

5. The voltage converter of claim 4 wherein the feedforward circuit further includes a capacitance implemented between the input node and a node between the gates of the first and second transistors.

6. The voltage converter of claim 3 wherein each of the first and second transistors is a P-type transistor.

7. The voltage converter of claim 6 wherein the current mirror is configured such that a decrease in the input voltage at the input node results in an increase in the current flowing through the other transistor.

8. The voltage converter of claim 3 wherein each of the first and second transistors is an N-type transistor.

9. The voltage converter of claim 8 wherein the current mirror is configured such that an increase in the input voltage at the input node results in an increase in the current flowing through the other transistor.

10. The voltage converter of claim 1 wherein the drive control circuit is configured such that the drive signal is also based on the error signal.

11. The voltage converter of claim 10 wherein the error signal is representative of a difference between the output voltage and the reference voltage which is representative of a desired target value of the output voltage.

12. The voltage converter of claim 11 wherein the feedback circuit includes a voltage divider configured to obtain a portion the output voltage.

13. The voltage converter of claim 12 wherein the feedback circuit further includes an operational amplifier configured to receive the portion of the output voltage and the reference voltage to generate the error signal.

14. The voltage converter of claim 1 wherein the feedforward signal includes one or more pulses having a changing tendency opposite to the change in the input voltage.

15. A method for operating a voltage converter, the method comprising:
operating a voltage conversion circuit to convert an input voltage to an output voltage;
generating an error signal with a feedback circuit based on the output voltage and a reference voltage, the error signal allowing adjustment of the output voltage;
generating a feedforward signal with a feedforward circuit having a current mirror, based on an operation of the current mirror resulting from a change in the input voltage; and
providing a drive signal for the voltage conversion circuit based at least in part on the feedforward signal.

16. A portable electronic device comprising:
a power management circuit configured to provide a first voltage;
a functional component having an electrical load and configured to utilize a second voltage; and
a voltage converter including a voltage conversion circuit configured to convert the first voltage to the second voltage, the voltage converter further including a feedback circuit configured to generate an error signal based on the second voltage and a reference voltage, the error signal utilized to adjust the second voltage, the voltage converter further including a feedforward circuit having a current mirror and configured to generate a feedforward signal based on an operation of the current mirror resulting from a change in the first voltage, the voltage converter further including a drive control circuit configured to generate a drive signal for the voltage conversion circuit based at least in part on the feedforward signal.

17. The portable electronic device of claim 16 wherein the portable electronic device includes a wireless device.

18. The portable electronic device of claim 17 wherein the functional component includes an amplifier or an illumination device.

19. The portable electronic device of claim 18 wherein the amplifier includes a power amplifier.

20. The portable electronic device of claim 18 wherein the illumination device includes a light-emitting diode.

* * * * *